July 20, 1937.  R. H. KRESS  2,087,380
CLUTCH CONTROL FOR AUTOMOBILES
Filed July 1, 1931  2 Sheets-Sheet 1
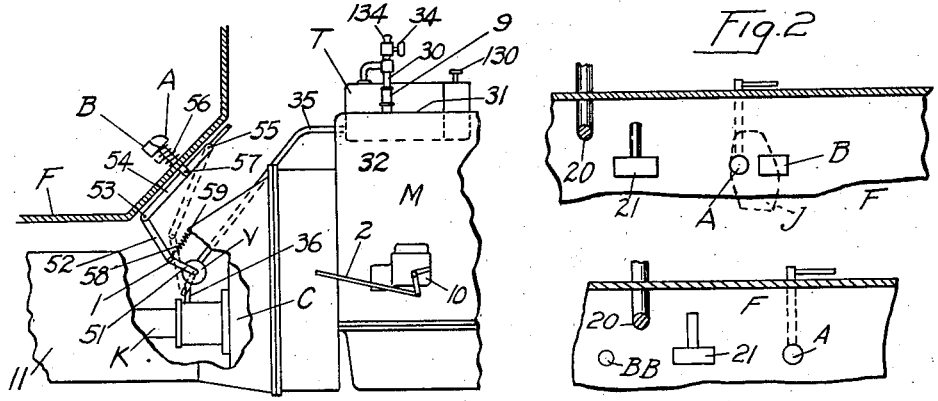
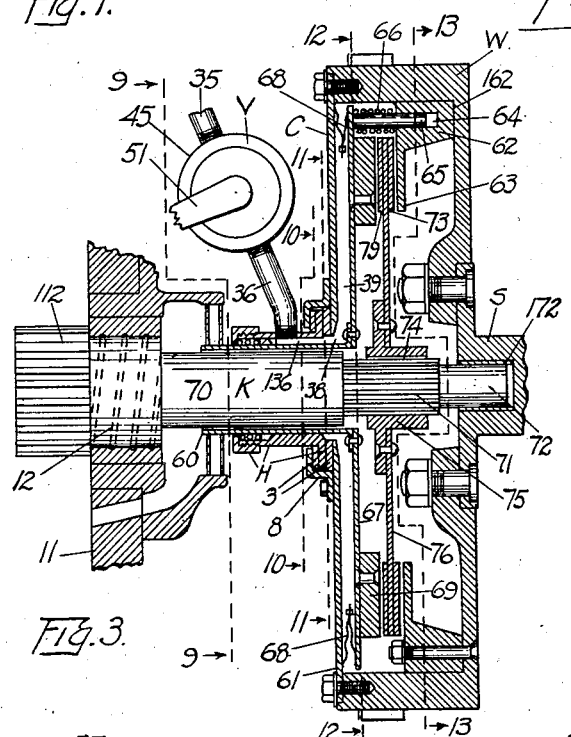
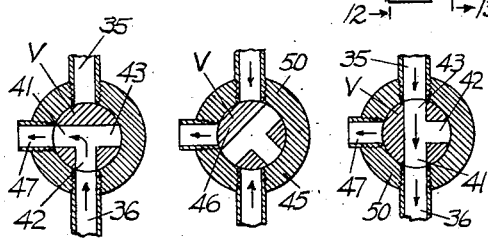
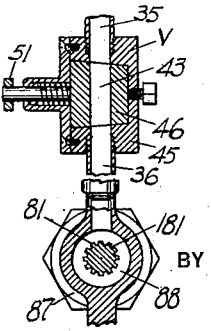
INVENTOR
Ralph H. Kress
BY
ATTORNEY July 20, 1937. R. H. KRESS 2,087,380
CLUTCH CONTROL FOR AUTOMOBILES
Filed July 1, 1931 2 Sheets-Sheet 2

INVENTOR
Ralph H. Kress
BY
Gardner R. Pearson
ATTORNEY

Patented July 20, 1937

2,087,380

UNITED STATES PATENT OFFICE 2,087,380

CLUTCH CONTROL FOR AUTOMOBILES

Ralph H. Kress, Lawrence, Mass., assignor to Patent Protection Corporation, trustee, Lowell, Mass., a corporation of Massachusetts Application July 1, 1931, Serial No. 548,122

1 Claim. (Cl. 192—.01)

This invention relates to devices for the more convenient control of automobiles the motive power of which is an engine of the explosive type. Such automobiles ordinarily have a frame or chassis supported by front steering wheels, and rear driving wheels in which is a differential connected, by what I will call a clutch shaft, with a clutch member, the other member of which is connected to what I will call the motor crank shaft which is driven by or forms part of the motor.

In addition to these parts and a steering post and wheel, there is ordinarily a foot brake with a foot brake pedal which extends up through a footboard within convenient reach of the operator's right foot.

In addition to a hand throttle, the movement of which controls a carburetor and thereby the motor, there is usually an accelerator or more properly an accelerator button which projects through the footboard within convenient reach of the operator's right foot and usually close to a footrest on which the right hand side of the operator's right foot can rest.

I preferably replace such a fixed footrest by a clutch control button which, as well as the accelerator button can be controlled by the right foot. By limiting the movement of this clutch button to a greater or less movement, the relative action on the clutch and on the engine speed, controlled by the accelerator button, can be changed within substantial limits.

By rocking the right foot or pushing it straight in, other combinations can be made. In fact all movements of the car except braking and gear shifting can be controlled by the right foot.

I can use a movable footrest for my clutch button or a fixed footrest associated with an electric push button.

This accelerator button through suitable connections controls the flow of gasoline and air to the carburetor and, therefore, the movement of the motor itself.

There is also a gear shift with a lever, within convenient reach of the operator's hand, the purpose of which is to change the relative power applied between the motor and the wheels by shifting gears in a well known manner.

Until recently, it has been necessary before shifting gears to push down on a clutch pedal, which also projects through the footboard, within convenient reach of the left foot, this action disengaging the members of the clutch carried respectively by the motor crank shaft and the clutch shaft, the shifting of gears being done while the clutch was disengaged.

Recently there have appeared devices adapted for what is known as free wheeling. The purpose of such devices is to allow the engine to idle but the car to run fast or faster than the engine, by momentum, as in coasting on a long, low grade.

The present method of free wheeling is illustrated by a pawl and ratchet connection between the engine and the driving wheels. If the engine is travelling faster than the wheels, it picks up and drives, but if the reverse is true, the machine coasts, the driving wheels moving faster than the engine. In other words, the engine can drive the drive wheels, but the drive wheels cannot drive the engine. It follows, therefore, that with such a device, if the motor should stop when idling at slow speed, the motor must be again started by the self starter as the momentum or movement of the driving wheels will not cause the motor to start.

With my device, however, the movement of the drive wheels will start the motor as soon as the clutch engages and the clutch engages as soon as the accelerator button is pressed as the tops of both are substantially level and both are close enough together to be under the sole of the shoe of the right foot of the operator. As there are no mechanical parts between the clutch control button and the self-contained clutch, there is no lag nor lost motion and the deceleration and the disengagement of the clutch synchronize smoothly. Besides this, in descending long, steep grades, with the present free wheeling devices, the momentum of the car is not retarded by the back pressure in the engine and the brakes must be used, even if the engine is shut off, while with my device, the engine ignition can be shut off and the right foot used on the clutch button alone. By pressing only the clutch control button, the engine and wheels are connected and the engine is turned over thus causing the back pressure to retard the car.

I accomplish the purposes of this invention preferably by providing a means of controlling a pneumatic clutch by the same foot, usually the right foot, which controls the accelerator. This is done in such a way that as the foot is pushed towards the footboard, the clutch control devices engage the clutch at the same time that the accelerator button operates to increase the speed of the motor.

Under the opposite conditions, when the right foot is moved away from the footboard and reaches a certain point, the clutch is disengaged, but this point is before the motor stops.

The result of this is that it is possible to get the effect of free wheeling in traffic, which means the motor idling and the automobile stopped, or to shift gears without touching a clutch pedal with the left foot.

I accomplish the desired purpose by using a pneumatic clutch operable by fluid pressure preferably from a tank connected with an end of one of the motor cylinders and controlled by a valve which in turn is controlled by a clutch button which projects through the footboard.

The usual clutch pedal with its mechanical connections to the clutch can be entirely dispensed with. I also dispense with the complicated and expensive parts of the clutch itself and the devices for operating it.

Preferably the accelerator button and clutch control button are so close together that one foot can press both, but the clutch button can be in a different place, as for instance where it can be operated by the left foot in place of the usual mechanical clutch pedal. However, when operated with the right foot the action is the opposite from that of the usual mechanical clutch wherein the clutch is disengaged as the pedal is forced towards the footboard.

The main feature of this invention is the use of a clutch forming part of which is pneumatic means controlled by a valve mechanism operative by the foot of the operator.

In the drawings, Fig. 1 is a side elevation partly broken away showing the parts of an automobile to which my device is applied.

Fig. 2 is a plan view of the footboard of an automobile showing the position of the control buttons, steering post and foot brake.

Fig. 2A shows a part of the footboard of an automobile with the controls in a different position from Fig. 2.

Fig. 3 is a vertical sectional view of a clutch of the preferred type.

Fig. 4 is a vertical sectional view similar to Fig. 3 of a modified type of clutch.

Figs. 5, 6 and 7 are vertical sectional views through the ports of a preferred type of control valve.

Fig. 8 is a vertical sectional view of the valve shown in Fig. 4 on the line 8—8.

Figure 9:
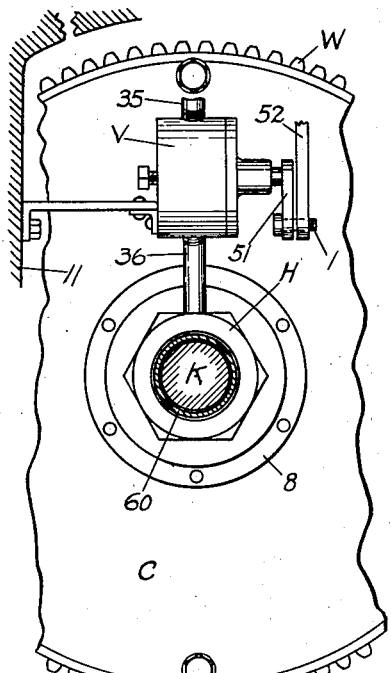
Fig. 9 is an enlarged sectional view on the line 9—9 of Fig. 3.
Figure 10:
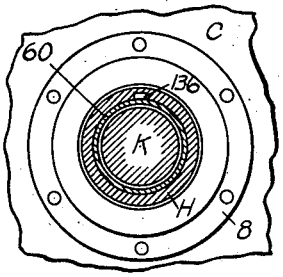
Fig. 10 is a sectional view on the line 10—10 of Fig. 3.
Figure 11:
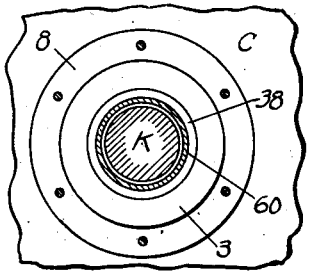
Fig. 11 is a sectional view on the line 11—11 of Fig. 3.
Figure 12:
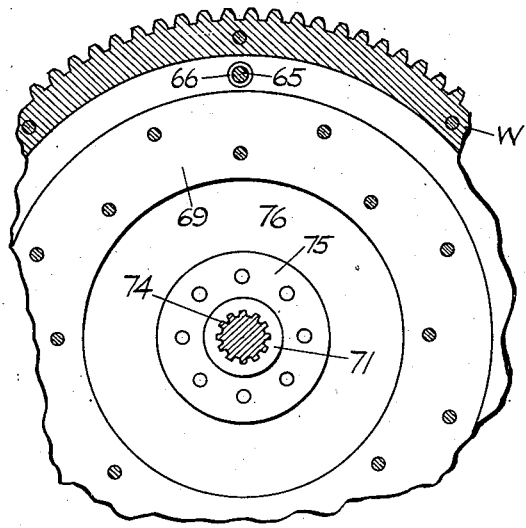
Fig. 12 is a vertical sectional view on the line 12—12 of Fig. 3.
Figure 13:
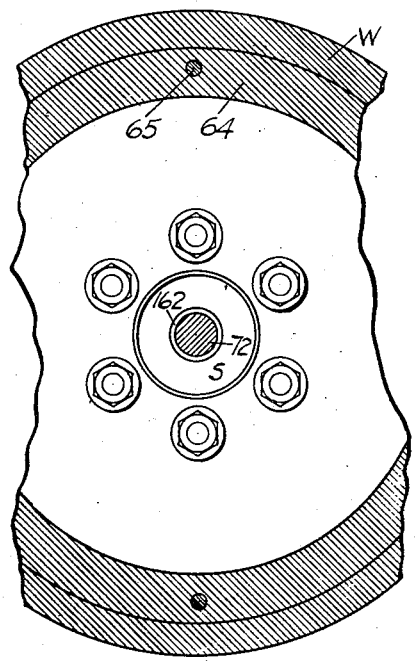
Fig. 13 is a vertical sectional view on the line 13—13 of Fig. 3.
Figure 14:
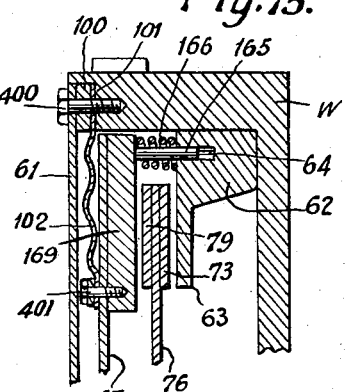
Fig. 14 is an enlarged vertical sectional view showing part of the tank with associated valves and nipple.

In the drawings, M represents the explosive motor of an automobile from which extends the motor crank shaft S to the clutch C. From clutch C extends the clutch shaft K to the transmission mechanism including the gear shift, shaft and differential.

F is the footboard through which project the accelerator button A and valve control button B. Preferably the valve control button B should be located so close to the accelerator A that both may be operated together by the sole of the shoe of the operator, but as shown in Fig. 2A, a similar control button BB can be located at the left of the steering post in place of the usual clutch pedal, or it might be located in any other convenient place at or in the footboard.

T is a tank capable of retaining pneumatic pressure, the tank T as shown being connected as by a pipe 30 to the top 31 of one of the motor cylinders 32, there being preferably a check valve 9 which holds pressure in the tank.

W is a fly wheel of the usual annular construction and V is a three way valve in a conductor 35, 36 which extends from tank T into the clutch C in a manner to be described.

Valve V is controlled by an arm 51 which is pivotally connected to an arm 52 which at 53 is pivoted to another arm 54 pivoted underneath the footboard at 55.

56 is a shank pivoted at 57 to arm 54 and carries at its other end the valve control button B, between which and footboard F is a button return spring 156 of the compression type.

58 is a tension spring connected at one end to the frame 59 and at the other end 1 to the arm 51 which operates valve V.

35 is a conductor or pipe from tank T to valve V and 36 is a conductor or pipe from the valve to the clutch C to be described.

Valve V has a casing 45 through which pipes 35 and 36 enter and also an exhaust 47.

46 is the revoluble plug having ports 41, 42 and 43 so arranged that as the valve arm 51 is moved, gas can be exhausted from 36 through 47 as shown in Fig. 5, all ports can be closed as shown in Fig. 6 or compressed gas from tank T can pass through pipe 35, port 43 and 41 through outlet 36 to the clutch.

20 indicates the steering post and 21 a brake pedal shown as located in the usual position at the right of the steering post while the accelerator button A and valve control button B are more at the right, as shown, in position to be operated by the right foot of the operator indicated by J.

As shown, the motor crank shaft S carries a fly wheel W in which is an annular recess 162 in which is a member 62 which carries an annular clutch face 63 there being a plurality of pin holes 64 in 62 to slidably receive pins 65 each fixed to an annular clutch plate 67 which forms a movable part of bellows indicated broadly by 68. The fixed member of bellows 68 is a plate 61 between which and plate 67 are the flexible bellows members 68, 68. 69 represents the annular clutch face carried by plate 67 opposite face 63.

Both clutch plates or members 67 and 61 are circumferentially rigid, but one, 67, is axially movable.

60 is a sleeve fixed to plate 67 and slidable on the part 70 of clutch shaft K.

Compressed gas passes in and out of valve V through passage 36, a passage 136 in the fixed bearing H and from thence to the annular passage 38 forming part of bellows 68.

Sleeve 60 which is fixed to plate 67 revolves with the bellows and is slidable axially on the part 70 of shaft K.

Gas entering bellows 68 pushes plate 67 away from 61 and compresses springs 66 and thus engages the clutch, and when valve V is turned as in Fig. 5, these springs force out the gas, closing the bellows and disengaging the clutch faces.

The bearing H may be of any suitable kind, the one shown including a cap, ball race and balls together with a flange, on each side of which are the two annular gaskets 3, 3 which are held between the annular flange 8 carried by plate 61 and plate 61 itself.

The clutch shaft K is reduced in size at 70 where it passes through sleeve 60 and again at 71 at which place it is slotted to receive one or more splines 74 by which a hub 75 which carries an annular clutch plate 76 is firmly fixed on shaft K.

This clutch plate 76 has on each side, the annular clutch faces 73 and 79 which revolve freely between the motor crank shaft clutch faces 63 and 69 except when compressed gas is allowed to flow into the bellows between the plates 61 and 67 by turning valve V to the position shown in Fig. 7.

When the valve is turned back to the position shown in Fig. 5, the springs 66 force this gas out as stated.

The end 72 of shaft K is shown as revoluble in a suitable bearing 172 in motor shaft S.

Clutch plate 76 should be resilient enough to permit lining 73 to engage face 63 when the bellows is expanded by the entry of compressed air or gas and when face 69 on that account has been forced over to the right of lining 79.

The part 112 of shaft K holds it in place against casing 11, and 12 represents grease grooves for lubrication.

Instead of depending wholly on compressed gas from the motor M, I prefer to use on the end of pipe 30 a nipple 134 to which an ordinary bicycle pump can be attached and the tank T filled after turning a valve 34 which valve can then be closed and the bicycle pump removed.

I also prefer to provide a hand pump indicated by 130 so that if the tank T has become empty after a car has been put up for sometime, pressure in it can be replaced without starting the engine either through nipple 134 or by operating pump 130.

In Fig. 4 is shown a slightly different type of pneumatic clutch. 1 is the motor crank shaft in which 2 is a bearing for the hub 82. 3 is a fly wheel and 4 is a clutch plate of annular form carried thereby while 5 is a clutch face on the inside of the fly wheel.

80 is a clutch shaft similar to K which has a reduced portion 181, with parallel slots 81, which passes through the hub 83 and into another hub 82 revoluble in bearing 2. 85 is a clutch plate carried by hub 82 and 84 is a clutch plate carried by hub 83 and 86 is a bellows between them. These clutch plates 84 and 85 have suitable faces adapted to engage respectively with 4 and 5.

Clutch shaft 80 preferably is enlarged at 180 and rests against a fixed bearing 87. In this construction both of the hubs 82 and 83 revolve together with their respective plates 84 and 85 and are also slidable axially on the reduced portion 181 of shaft 80. Their movements are limited by a stop ring 189 whereby the compression springs 6, 6 which tend to force plates 84 and 85 together are prevented from allowing the faces of plates 84 and 85 to engage the faces 4 and 5 when it is desired that the clutch should be disengaged.

These springs 6, 6, tend to keep the bellows closed and force the air out of the bellows.

As shown, the axial movement of hub 81 is limited by the face of plate 84 engaging 4 in its movement towards the part 180 of shaft 80 whereby there is always left an annular passage 88 through which air from pipe 36 can enter a channel such as 89 in the hub 81. From this channel 89, the air gets into and out of the bellows Z.

The hubs 82 and 83 are provided with internal longitudinal ribs or splines such as 281 and 381 which engage slots 81 in the part 181 whereby all revolve together with the shaft 80 in bearing 87 and in a bearing 2 in the end of motor crank shaft 1 when the clutch members are not engaged.

When the clutch members engage, however, the shaft 1 drives the shaft 80.

Figure 15:
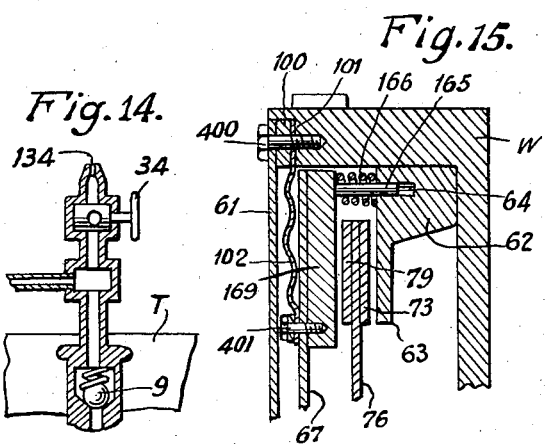
Fig. 15 is a vertical sectional detail showing a modified form of clutch.

In Fig. 15, I show another modification of the pneumatic clutch in which the fly wheel W and the parts 62 as well as the pin holes 64 and plate 61 are the same as in the construction shown in Fig. 3.

The plate 76 with the linings 73 and 79 is also the same as is the other clutch plate 67. The annular face 169 of plate 67 is slightly different and projecting from it are a plurality of pins such as 165 which enter pin holes 64 and around which are the returning compression springs 166.

Fly wheel W has an annular depression 101 in which as shown is a holding ring 100 these two holding a single diaphragm 102 and being held by screws 400 which also hold the plate 61 which becomes a fixed member of a bellows or pneumatic pressure arrangement. The compressed gas enters by a channel similar to 38 into the space between 61, 67 and 102.

401 represents one of a number of stops to limit the outward movement of springs 166.

I claim:

The combination in an automobile having a motor, a motor crank shaft, drive wheels operable by a clutch shaft in alignment with the motor crank shaft, a footboard and a source of fluid pressure; of a fluid pressure operable clutch between the motor crank shaft and the drive wheels, said clutch having two clutch members, one carried by the motor crank shaft and the other by the clutch shaft, one clutch member being revoluble with one shaft and the other being revoluble with and slidable axially on the other shaft to engage the other clutch member; an annular flexible disk member which seals a substantially annular chamber in the clutch, the center of which chamber is at the axis of the shafts, said chamber being connected with the source of fluid pressure by a conductor; a control valve in said conductor; and a valve control button which connects with said valve and projects through the footboard within convenient reach of the right foot of the operator.

RALPH H. KRESS.